(12) United States Patent
Freeman et al.

(10) Patent No.: US 7,133,510 B1
(45) Date of Patent: *Nov. 7, 2006

(54) MANAGING ACCESS TO RESOURCES AND SERVICES UTILIZING CALL INFORMATION

(75) Inventors: Anita L. Freeman, Dublin, CA (US); Edward G. Richardson, San Jose, CA (US); Giovanni Di Simone, Milpitas, CA (US); Luis A. Viriato, Livermore, CA (US)

(73) Assignee: Cisco Technology, Inc., San Jose, CA (US)

( * ) Notice: This patent issued on a continued prosecution application filed under 37 CFR 1.53(d), and is subject to the twenty year patent term provisions of 35 U.S.C. 154 (a)(2).

Subject to any disclaimer, the term of this patent is extended or adjusted under 35 U.S.C. 154(b) by 175 days.

(21) Appl. No.: 09/281,628

(22) Filed: Mar. 30, 1999

(51) Int. Cl.
- *H04M 3/00* (2006.01)
- *H04M 3/42* (2006.01)
- *H04M 7/00* (2006.01)

(52) U.S. Cl. ............ 379/188; 379/211.02; 379/212.01; 379/220.01

(58) Field of Classification Search ................ 379/188, 379/211, 201, 220, 88.22, 212.01, 211.02, 379/220.01; 370/259; 705/7
See application file for complete search history.

(56) References Cited

U.S. PATENT DOCUMENTS

| | | | | |
|---|---|---|---|---|
| 5,533,115 A | * | 7/1996 | Hollenbach et al. | 379/220 |
| 5,644,631 A | * | 7/1997 | Sattar et al. | 379/201 |
| 5,729,599 A | * | 3/1998 | Plomondon et al. | 379/211 |
| 5,812,533 A | * | 9/1998 | Cox et al. | 370/259 |
| 5,867,562 A | * | 2/1999 | Scherer | 379/88.22 |
| 6,070,142 A | * | 5/2000 | McDonough et al. | 705/7 |
| 6,088,437 A | * | 7/2000 | Amick | 379/211.02 |
| 6,134,530 A | * | 10/2000 | Bunting et al. | 705/7 |
| 6,188,751 B1 | * | 2/2001 | Scherer | 379/88.22 |

* cited by examiner

*Primary Examiner*—Wing Chan
*Assistant Examiner*—Thjuan P. Knowlin
(74) *Attorney, Agent, or Firm*—Cindy Kaplan

(57) ABSTRACT

Techniques for managing access to resources utilizing call information are provided. Resources of like type can be pooled into resource groups and customers can then be sold a base amount of a resource, to be taken from the appropriate resource group, that the customer can then provide to users or callers. The server of the resources utilizes the telephone number of the party called and call type in order to identify the resource that is requested. If the base amount of the requested resource has already been allocated, an overflow amount can be utilized to provide additional resources of a like type, if they are available. Thus, the resources can be efficiently managed to allow a high utilization of the available resources.

27 Claims, 9 Drawing Sheets

MANAGING ACCESS TO RESOURCES AND SERVICES UTILIZING CALL INFORMATION

BACKGROUND OF THE INVENTION

The present invention relates to managing access to resources and/or services using customer information. More specifically, the invention relates to utilizing customer configurations that include information on the network wide resources that are available for the customer.

In almost any consumer market, if the cost of buying an item is high, it can be profitable to buy the item and lease it to others. We are all very familiar with this concept when we move because no one would think of buying a moving van; it makes much more sense to rent one from a rental company. Although there are many other situations where it makes good business sense to lease equipment, one that is becoming increasingly more prevalent is the leasing of communications equipment.

Communications hardware can be costly for companies to purchase, but there are some other factors that make leasing even more attractive. As a company grows (or shrinks), the company may require more (or less) bandwidth for communications. For this reason, communications companies are increasingly offering solutions that allow customers to scale their bandwidth with their needs.

As an example, Internet service providers (ISPs) require increasingly more equipment as their companies grow. ISPs that offer dial up connections will need increasingly more modems as the number of users increases. In addition to the cost of buying more equipment is the associated cost (and time) of integrating the new equipment into the existing hardware infrastructure. It is for these and other reasons that many ISPs lease these resources from another provider.

A network access server (NAS) is a system that provides clients with dial access to a network. Continuing with the example of an ISP that provides users with dial up connections to the Internet, a NAS would typically include a trunk card to receive multiple trunk lines from a public switched telephone network (PSTN) and multiple modems. The cost of a NAS may make it more cost effective for an ISP to lease a certain number of modems of a NAS (or multiple NASs) instead of purchasing the NAS. In addition to lowering the initial cost, the ISP can increase the number of simultaneous connections by leasing more modems.

As leasing resources becomes more prevalent, what is needed are techniques for managing access to resources, such as in NASs. It would also be beneficial to have techniques of dynamically allocating resources so that over subscription is possible, but also allows more efficient use of the resources. Additionally, it would be beneficial to screen access attempts so that known unauthorized access attempts will not tie up the resources.

SUMMARY OF THE INVENTION

The present invention provides techniques for managing access to resources and/or services utilizing call information. Resources of like type are typically pooled into resource groups. Customers can then be sold a base amount of a resource, to be taken from the appropriate resource group, that the customer can then provide to users or callers. The server of the resources utilizes the telephone number of the party called and/or call type in order to identify the resource that is requested. A customer profile can information for a customer including base and overflow amounts for resources. If the base amount of the requested resource has already been allocated, an overflow amount can be utilized to provide additional resources of a like type, if they are available. Thus, the resources can be efficiently managed to allow a high utilization of the available resources. Some specific embodiments of the invention are described below.

In one embodiment, the invention provides a computer implemented method of managing access to resources. A telephone number and/or a call type are received. The telephone number is of a party called by a caller requesting access to a resource, such as a dialed number information service (DNIS) number. It is determined if the telephone number and/or call type are specified in a customer profile as valid for accessing a resource the customer is providing to callers. The customer profile can include information on the resource such as a base amount of the resource that is available to the customer to provide to callers and an overflow amount that can be utilized to supplement the base amount when more is needed as long as resources are available. The call type can be utilized to identify the resource to which the caller is requesting access if the telephone number and/or call type are specified in the customer profile.

In another embodiment, the invention provides a network access server that manages access to resources. A trunk receives a telephone number and/or a call type, wherein the telephone number is of a party called by a caller requesting access to a resource. Within the network access server, a memory stores multiple customer profiles that specify telephone numbers and/or call types that are valid for accessing a resource. A processor determines if the telephone number and/or call type are specified in a customer profile as valid for accessing a resource the customer is providing to callers.

In another embodiment, the invention provides a computer implemented method of managing access to services. A telephone call from a caller requesting access to a service is answered. Based on the telephone number and/or call type of the call, a customer profile is selected. The selected customer profile is accessed to determine the service to be applied to the call. In preferred embodiments, the services can be local services, virtual private dial network (VPDN) tunnels or direct access to remote services.

Other features and advantages of the invention will become readily apparent upon review of the following description in association with the accompanying drawings.

DETAILED DESCRIPTION OF PREFERRED EMBODIMENTS

In the description that follows, the present invention will be described in reference to embodiments that manage resources available in NASs. More specifically, the embodiments will be described in reference to ISPs or telephone companies that are purchasing resources that they will then provide to users. Accordingly, the ISPs or telephone companies are "customers" of the resources who then sell the resources to other users or callers. However, embodiments of the invention are not limited to any particular resources, architecture or specific implementation. Therefore, the description of the embodiments that follows is for purposes of illustration and not limitation.

Figure 1:
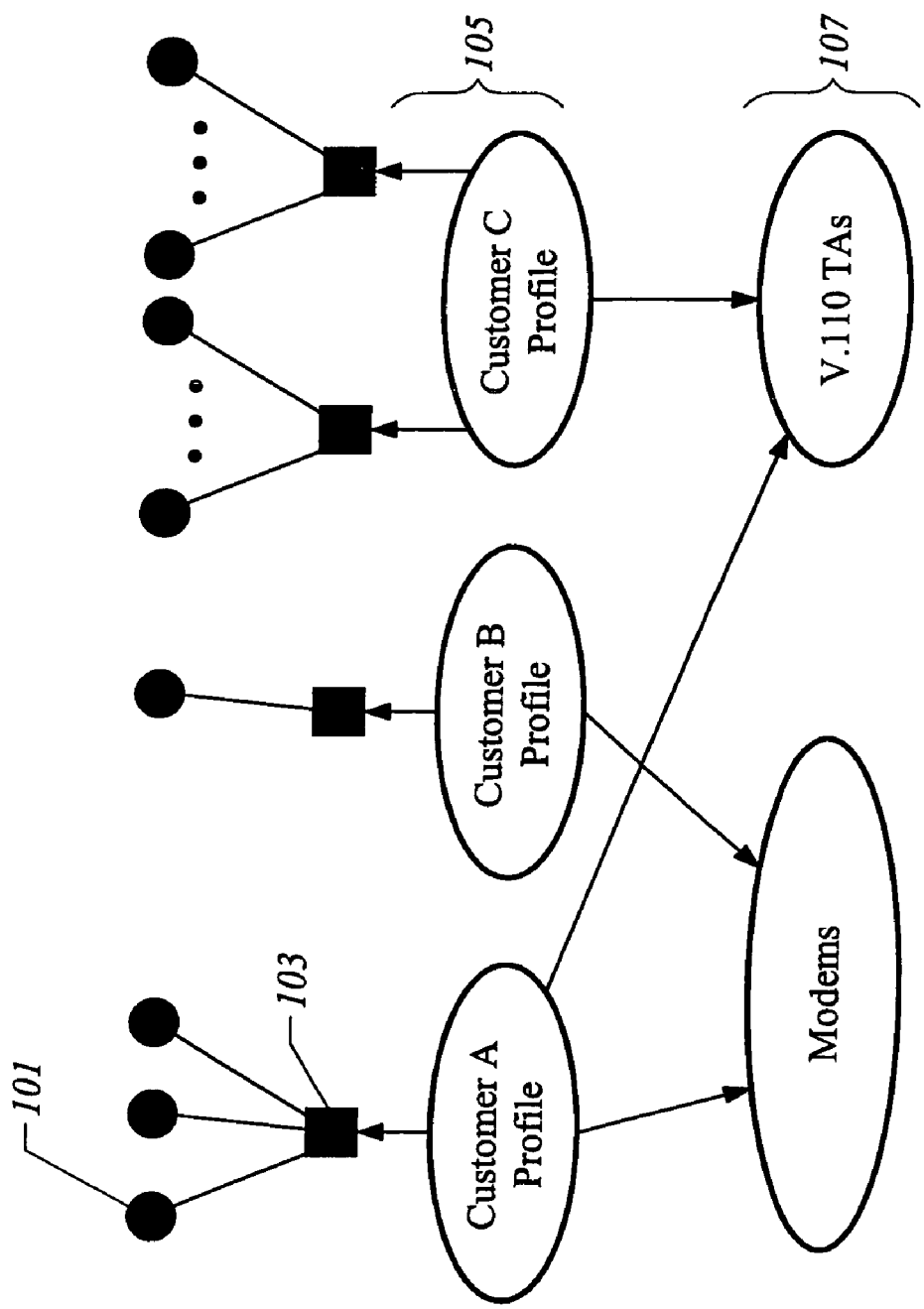
FIG. 1 shows an example of DNIS groups, customer profiles and resources groups.

FIG. 1 shows an example of DNIS groups, customer profiles and resources groups that can be utilized with the invention. A DNIS number 101 is the telephone number of the called party. Conceptually, one can think of DNIS number 101 as the number dialed by a caller. However, in some instances, the DNIS number provided to a NAS from a public switched telephone network (PSTN) will be different from the number that was dialed (e.g., 800 numbers). The DNIS number and/or call type information can be obtained from the PSTN using primary rate interface (PRI), channelized T1 trunk service (CT1), channelized T3 trunk service (CT3), channelized E1 service (CE1), signaling system 7 (SS7), and the like.

One or more DNIS numbers can be pooled together into a DNIS group 103. Typically, the DNIS numbers in a DNIS group correspond to a particular customer, service offering, or both. DNIS group 103 can be identified by an identifier string and description. An optional field in a DNIS group can be the lead number, such as 800, that is used for a public network database lookup to form a plain old telephone service (POTS) routable DNIS number.

Customer profiles 105 provide information for a particular customer. A customer profile is a record that identifies a customer configuration and can include resources that are valid for the customer and a base amount (e.g., number of sessions) that can be used. Each customer profile includes zero or more DNIS group. In each customer profile, a call type can be associated with a DNIS group. The DNIS group and/or call type pairs in each customer profile represent calls that can be provided resources for that customer. In a preferred embodiment, the call type can be voice, modem, fax, digital, V.110, or V.120.

Resources can be modems, HDLC controllers, integrated services digital network (ISDN) adapters, V.110 terminal adapters (TAs), V.120 TAs, voice over IP codecs, personal handyphone system Internet access forum (PIAFS), and the like. Resources of like type are pooled into resource groups 107. Accordingly, resource groups 107 represent a grouping of similar hardware and/or functionality (or services). A resource group can be defined using specific hardware ports or channel ranges. A customer profile can be associated with one or more resource groups with the discriminating factor being the call type. Thus, a customer can have one DNIS group for many different services.

Figure 2:
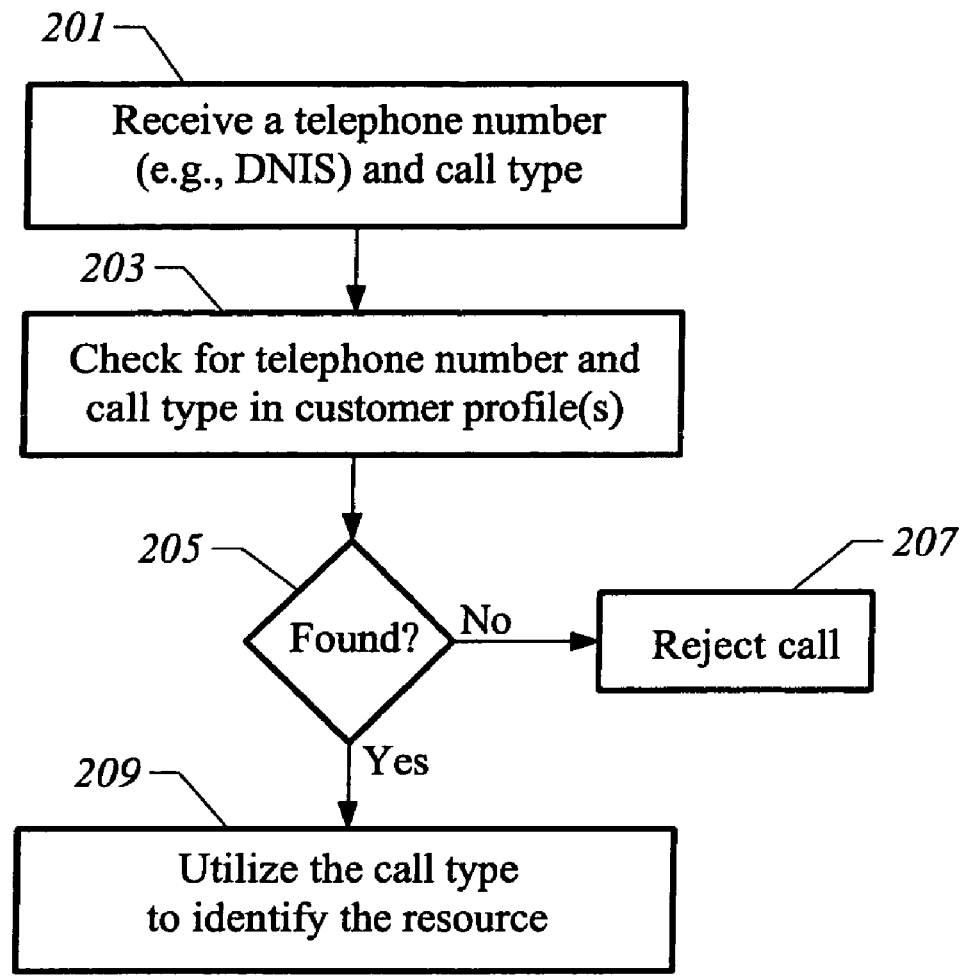
FIG. 2 illustrates a flow chart of a process of managing access to a resource utilizing a telephone number and call type.

Before describing in detail the information that can be stored in customer profiles, it may be beneficial to describe an aspect of the invention that manages access to a resource utilizing a telephone number and call type. FIG. 2 illustrates a flow chart of a process of managing access to a resource that can be implemented in a NAS. At a step 201, a telephone number, such as a DNIS number, and call type are received. The telephone number is of a party called by a caller requesting access to a resource.

A check is performed at step 203 to determine if the telephone number and call type pair are specified in a customer profile as being valid for accessing a resource that the customer is providing to callers. The telephone number and call type pairs can be stored in a lookup table or other ways that are known in the art. If the telephone number and call type pair is not found at a step 205, the call is rejected at a step 207. The call is rejected because there is not customer that is providing the requested resource for the telephone number and call type pair. Typically, the call is rejected by not being answered, but the call can also be rejected by a busy or channel not available (CNA) signal.

If the telephone number and call type pair is found in a customer profile, the call type is utilized to identify the resource to which access is requested at a step 209. As will be described in more detail below, the requested resource may not be available and the call could still be rejected. However, let us assume to complete the flow chart of FIG. 2 that the resource is available and the call is accepted. FIG. 2 is provided to show a high level view of aspects of the invention and as with the other flow charts shown, no order should necessarily implied to the steps and steps may be added deleted and combined as desired.

A NAS is typically a router that includes, among other things, a processor and a memory that execute an operating system. Accordingly, embodiments of the invention can be computer programs including computer code that are stored on a storage medium such as a floppy drive, hard drive, CD-ROM, random access memory (RAM), read only memory (ROM), flash memory, or signals embodied on a carrier wave (such as sent over a network like the Internet).

Figure 3:
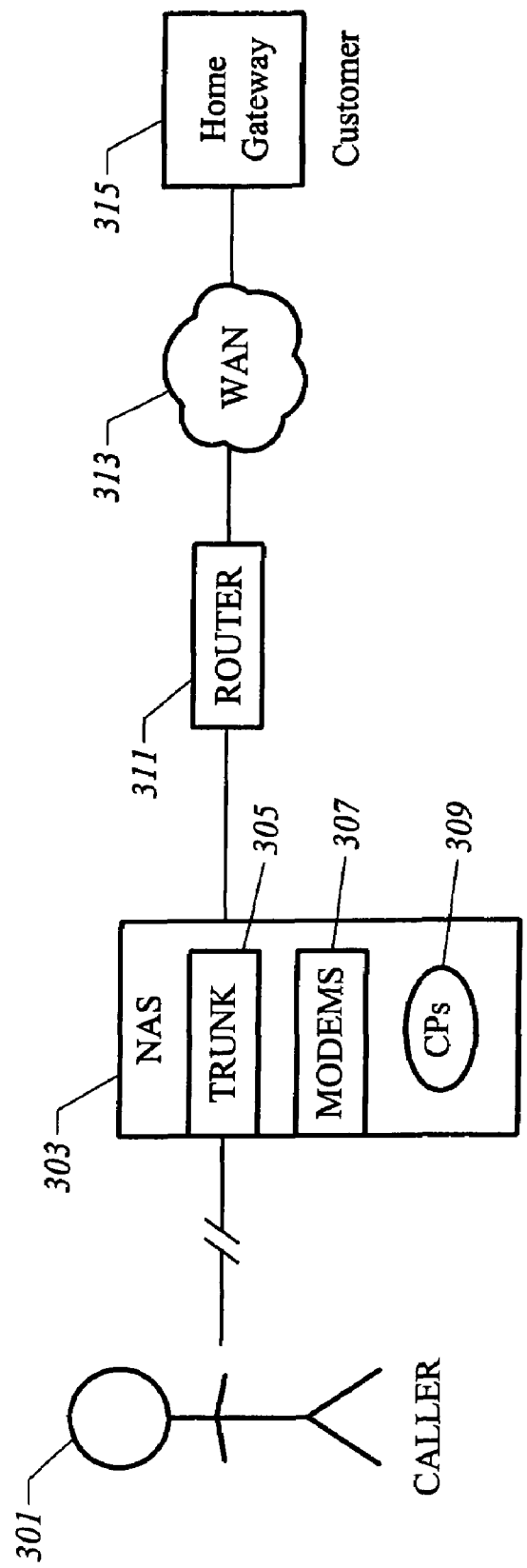
FIG. 3 shows an embodiment of a system that includes a single NAS that utilizes customer profiles (CPs) for managing access to resources, where the customer profiles can specify valid telephone number and call type pairs.

Embodiments of systems that utilize the invention can include one or more NASs. FIG. 3 shows an embodiment of a system that includes a single NAS that utilizes customer profiles (CPs) for managing access to resources. A caller 301 makes a call to request a resource provided by a customer. A NAS 303 receives the call into a trunk 305. The trunk, for example, can receive voice lines through a PSTN. NAS 303 is also shown to include resources such as modems 307. Additionally, NAS 303 includes CPs 309 that specify valid telephone number and call type pairs.

A router 311 is connected between and facilitates communication between NAS 303 and a wide area network (WAN) 313. An Ethernet switch and router pair can also be utilized to communicate between the NAS and WAN. A home gateway 315 is shown to represent the customer that is providing the resources in NAS 303 in order to obtain data and/or services from the customer. FIG. 3 provides one typical system that can be utilized with the invention and one of skill in the art would realize that additional or fewer subsystems can be utilized without departing from the spirit and scope of the invention.

Figure 4:
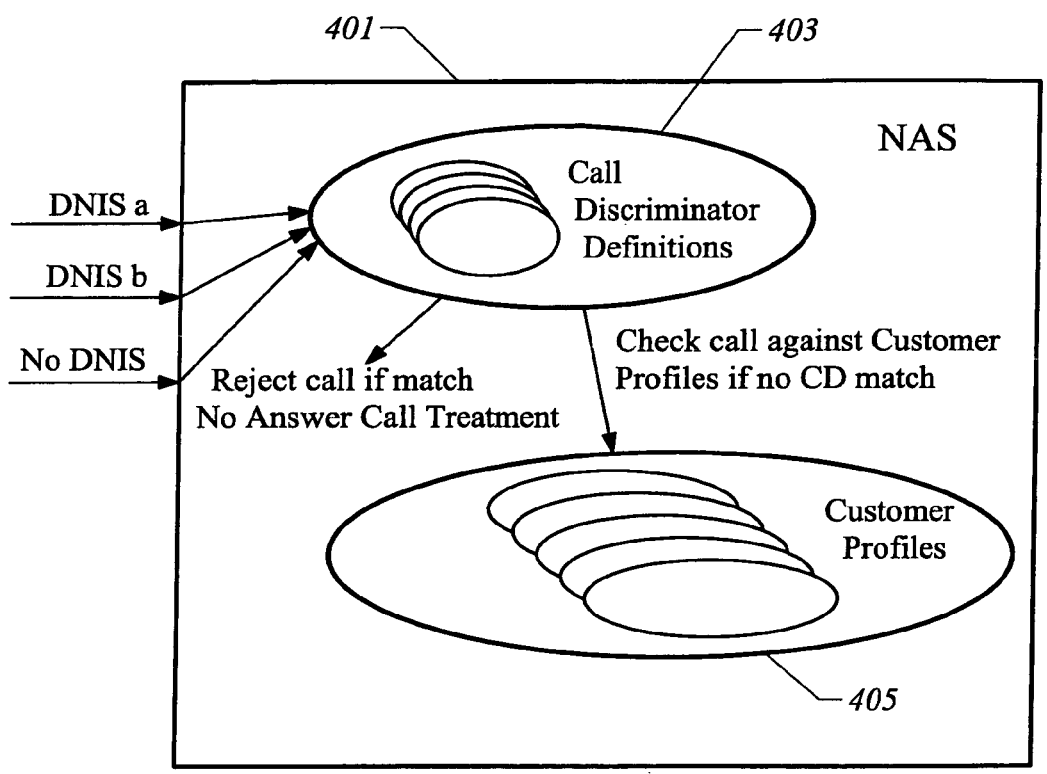
FIG. 4 shows that call discriminator definitions can be utilized reject calls that are know to be invalid requests for resources.

A pervasive problem with remote access is providing protection from unauthorized access to resources. An aspect of the invention provides call discriminator definitions that define telephone number and call type pairs that should be rejected as unauthorized. FIG. 4 shows how call discriminator definitions can be utilized reject calls that are known to be invalid requests for resources.

Within a NAS 401 are call discriminator definitions 403. Call discriminator definitions 403 provide telephone number and call type pairs that should be rejected before acquiring access to the requested resource. For example, the call can be rejected by a no answer call treatment. If a match for the received telephone number and call type pair is not found in the call discriminator definitions 403, customer profiles 405 are accessed to attempt to find a match.

Figure 5:
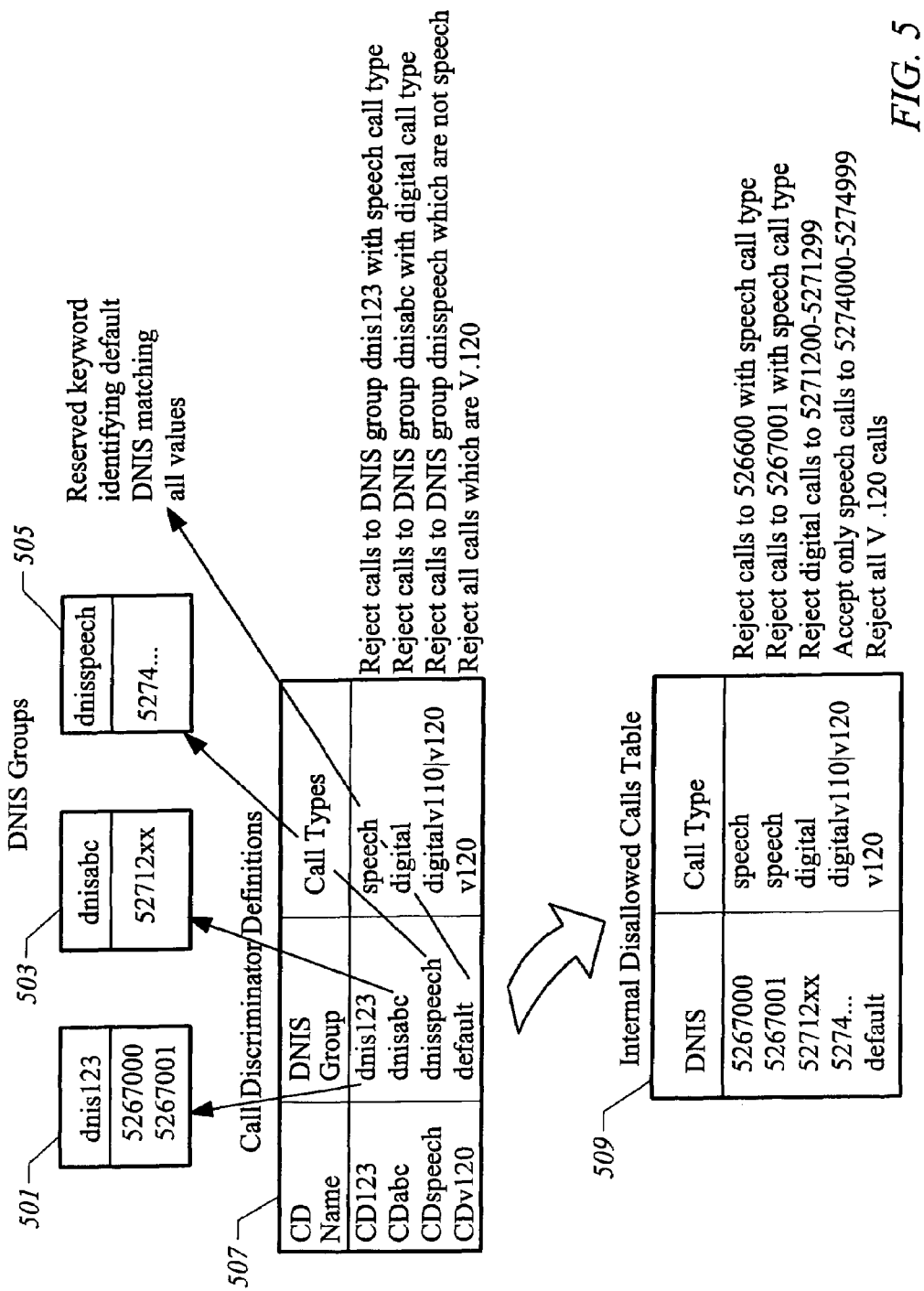
FIG. 5 shows a few examples of how call discriminator definitions can be utilized to reject calls.

FIG. 5 shows a few examples of how call discriminator definitions can be utilized to reject calls. DNIS groups 501, 503 and 505 represent DNIS groups that are defined with the NAS. As shown, each DNIS group is includes a string identifier (e.g., "dnis123" for DNIS group 501). Each DNIS group includes one or more numbers that are members of the group, where wild card characters can be utilized to more easily represent multiple related numbers.

Call discriminator definitions 507 include tuples of call discriminator (CD) names, DNIS groups and call types. The CD names identify the definition and the DNIS groups and call type specify the calls that each definition specifies should be rejected. Thus, call discriminator definitions 507 specify the calls that should be rejected, but in some embodiments it may be beneficial to specify calls that should not be rejected out of hand.

As an example, CD name "CD123" specifies that calls to DNIS group 501 (i.e., either 5267000 or 5267001) that are of call type "speech" should be rejected. Additionally, a DNIS group of "default" can be utilized to specify all DNIS numbers. A table 509 represents how call discriminator definitions 507 can be stored internally in memory.

Customer profiles can define the policy for call acceptance, resource allocation and resource configuration. As mentioned above, a call can be matched to a customer by DNIS group and call type pairs for call acceptance. Additionally, each customer profile can be associated with one or more resource groups, with the discriminating factor being the call type, that can be allocated to the customer. If a customer desires or requires a specific configuration of the resources, this information can also be stored in the customer profile.

The resource pooling characteristics for a given customer and service combination can be defined by customer profiles. For example, customer A can have one profile that specifies a maximum of 20 resources for ISDN circuit switch data (CSD) calls and another profile that specifies 100 resources for modem calls. Although preferred embodiments can utilize multiple customer profiles for a customer, other embodiments can utilize a single profile to store information for multiple resources.

A customer profile can define a base amount or size that specifies the number of resources that can be consumed before the profile enters an overflow state, where the current and/or subsequent calls may or may not be accepted. The base amount can be 0 where no calls will be accepted, x where x calls will be accepted or defined to accept all calls. In preferred embodiments, overflow is configurable. However, if overflow treatment is not configured (or is not available) and the number of resources may be consumed equals the base amount, then all new calls will be rejected until the number of active calls fails below the base amount.

The overflow amount can be configured in a way similar to the base amount. The overflow amount can be 0 where no overflow calls will be accepted, y where y overflow calls will be accepted or defined to accept all overflow calls. As will be shown in FIG. 8, overflow calls can utilize available resources in another NAS. However, if no resources are available for overflow calls that should be accepted, the overflow calls are rejected. All calls that are accepted in an overflow state can be marked as "overflow." In preferred embodiments, the base and overflow amounts are measured in sessions, but they could be measured in other ways including bandwidth. Counters can be maintained to measure the base and overflow amounts currently being used.

Overflow is typically used to allow billing at different rates based on concurrent calls. The base amount of calls can be billed at a flat rate, for example, and each additional call that is accepted for a customer while in an overflow state (or the call is marked "overflow") can be billed differently at a higher rate. Once a call is marked "overflow," preferred embodiments maintain this label (and billing rate) for the duration of the call even if the customer returns to a nonoverflow state.

A customer profile can also include outgoing session management information to direct the answered call to the appropriate destination. The outgoing session management information could direct a call to a local service such as an authentication server (e.g., retail dial applications and intranet/Internet access). Alternatively, the outgoing session management information could specify all the information that is required to set up or reject a virtual private dial network (VPDN) session with the customer's home gateway (e.g., wholesale dial applications). Thus, if a VPDN profile is specified and a call is accepted, a VPDN tunnel will be established using the information in the VPDN profile. The outgoing session management information can also specify direct access to remote services such as for the wholesale dial customer's authentication, authorization, and accounting (AAA) and domain naming system (DNS) server applications.

Figure 6:
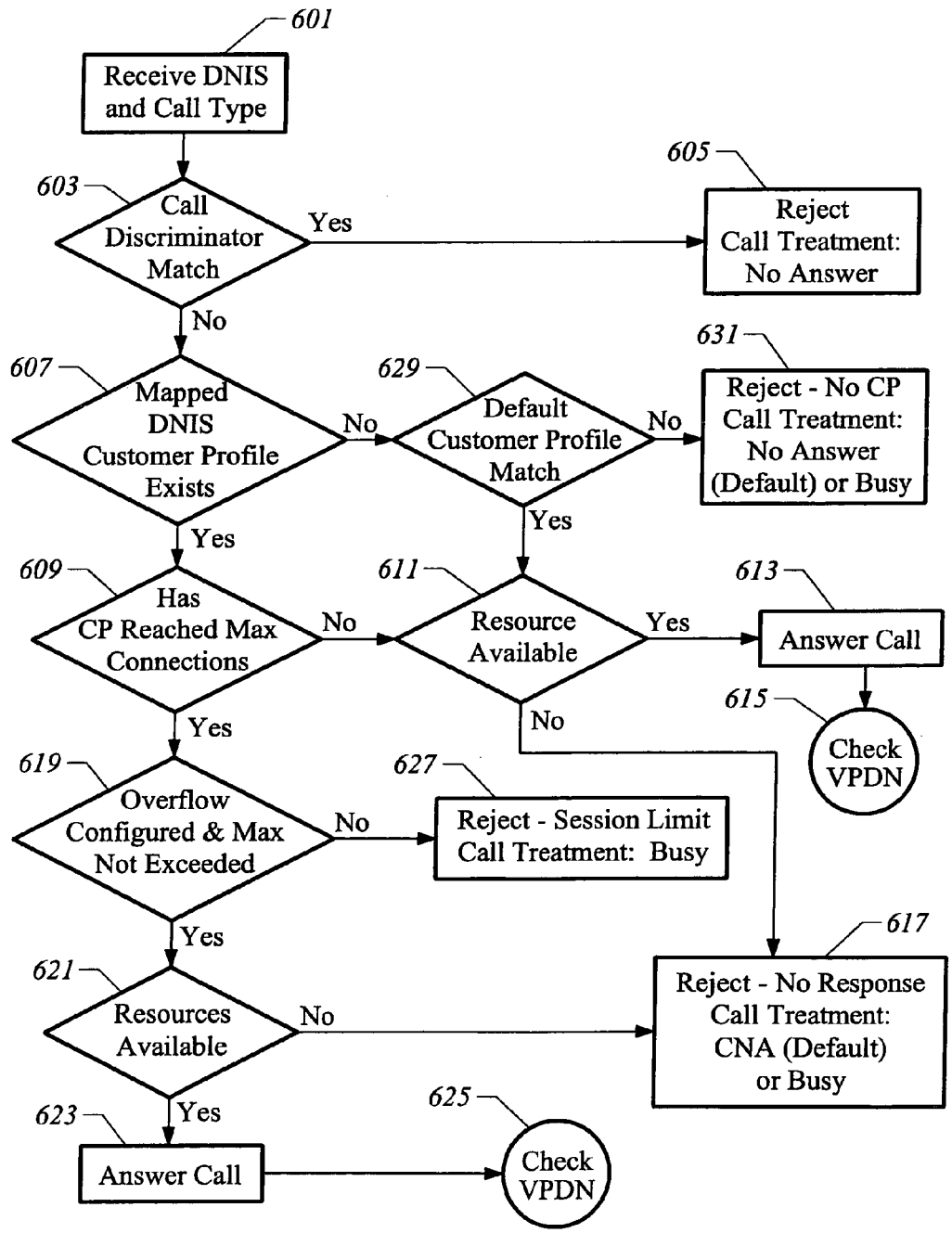
FIG. 6 illustrates a flow chart of a process of managing resources with a single NAS, such as the one shown in FIG. 3.

Now that customer profiles have been described in more detail, one embodiment of managing of resources with a single NAS will be described. FIG. 6 illustrates a flow chart of a process of managing resources with a single NAS, such as the one shown in FIG. 3.

At a step 601, a DNIS number and call type are received by the NAS. The NAS checks to see if the DNIS number and call type have a match in the call discriminator definitions at a step 603. The call discriminator definitions specify DNIS number and call type pairs that should be rejected. If there is a match in the call discriminator definitions, the call should be rejected at a step 605, such as by a no answer treatment.

If no match is found in the call discriminator definitions, it is then determined if there is a customer profile that specifies the DNIS number and call type pair at a step 607. If a customer profile specifies the DNIS number and call type pair, that call should generally be accepted, if a resource is available as follows.

At a step 609, it is determined if the customer is consuming the maximum number of resources specified by the base amount in the customer profile. If no, and a resource is available at a step 611, the call is answered at a step 613. A check is made at a step 615 to determine if VPDN information is specified in the customer profile because if it is, a VPDN tunnel is established. Aspects of VPDN tunneling are discussed in more detail in application Ser. No. 08/687,973, filed Jul. 29, 1996, and entitled "Virtual Dial-Up Protocol for Network Communication," which is hereby incorporated by reference. If, instead, a resource is not available at step 611, the call is rejected at a step 617, such as by a CNA or busy signal.

Returning to step 609, if the customer has consumed the maximum number of connections specified by the base amount in the customer profile, it is determined if overflow is configured in the customer profile and whether the overflow amount has been exceeded at a step 619. If overflow is configured and the overflow amount has not been exceeded, it is determined if any resources are available at a step 621. In resources are available, the call is answered at a step 623 and a VPDN check is performed at a step 625.

If resources are not available at step 621, the call is rejected at a step 617. Additionally, if overflow is not configured or the overflow amount has been reached at step 619, the call is rejected at a step 627, such as by a busy signal.

In some circumstances, it is beneficial to have a customer profile that does not specify any specific DNIS groups, such as by using a reserved word "default" meaning all DNIS numbers. A customer profile that includes all DNIS numbers is called a default customer profile and it has the potential (limited by resources available) to accept all calls of a call type in which the DNIS number and call type pair was not found in a customer profile. Thus, a call type alone can specify a resource.

Returning to FIG. 6, if the DNIS number and call type pair are not found in a customer profile at step 607, it is determined if a default customer profile exists that matches the call type at a step 629. If a default customer profile exists that matches the call type, it is determined if a resource is available at step 611 and the process continues as described above in reference to nondefault customer profiles.

If there is not a default customer profile that matches the call type at step 629, the call is rejected at a step 631, such as by no answer or a busy signal. Default customer profiles can be utilized to allow a telephone company to mix wholesale and retail dial services. Nondefault customer profiles can be utilized for the telephone company's wholesale business. The default customer profile can be established for retail business that will be authorized locally. Additionally, default profiles can be utilized to provide domain name based VPDN management by specifying the domain name and other VPDN information in a default customer profile.

Figure 7:
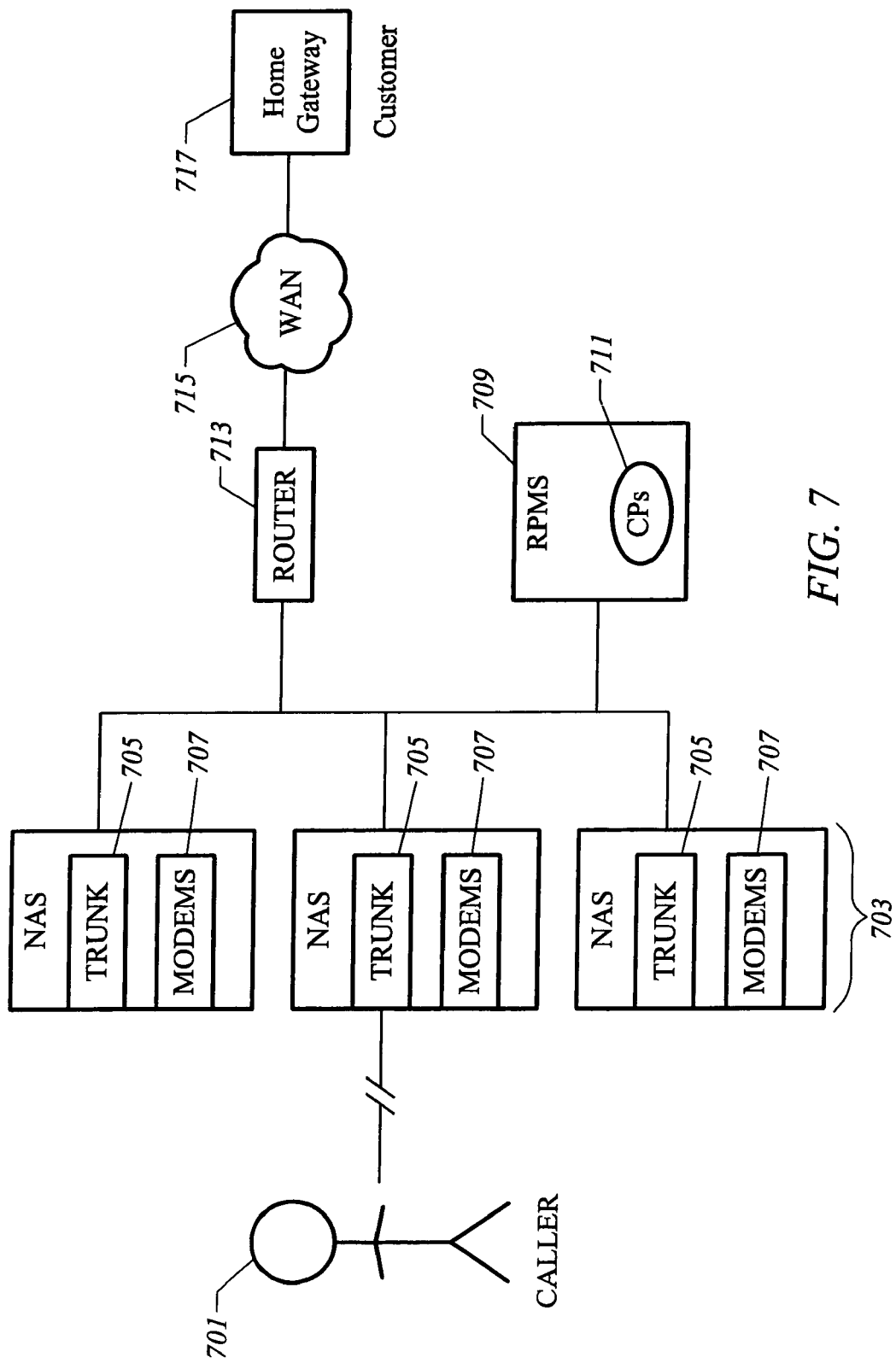
FIG. 7 shows an embodiment of a system that includes multiple NASs in communication with a resource pool manager server (RPMS) for managing access to resources.

The above has described embodiments that utilize a single NAS, however, embodiments of the invention can also include multiple NASs. FIG. 7 shows an embodiment of a system that includes multiple NASs in communication with a resource pool manager server (RPMS) for managing access to resources. A caller 701 makes a call to request a resource provided by a customer. One of multiple NASs 703 receives the call into one of trunks 705. As before, trunks 705, for example, can receive voice lines through a PSTN. NASs 703 are also shown to include resources such as modems 707. As described above, the invention can be advantageously applied to other resource types.

A resource pooling manager server (RPMS) 709 includes CPs 711 that specify valid telephone number and call type pairs for the resources of NASs 703. A router 713 is connected between and facilitates communication between NASs 703 and a WAN 715. An Ethernet switch and router pair can also be utilized to communicate between the NASs and WAN. A home gateway 717 is shown to represent the customer that is using the resources in NASs 703 in order to obtain data and/or services from the provider. FIG. 7 provides one typical system that can be utilized with the invention and one of skill in the art would realize that additional or fewer subsystems can be utilized without departing from the spirit and scope of the invention.

RPMS 709 stores customer profiles 711 for NASs 703 and is in communication with the NASs. In general, the NASs support the resource group implementation and the RPMS supports the customer profiles. It should be noted that each of the NASs can include a backup customer profile (not shown) that is a customer profile that is to be used to establish the call handling policy if the NAS cannot establish a connection with RPMS 709. For example, a backup CP can specify DNIS numbers that should be answered and the resources are allocated based on the DNIS numbers alone (i.e., not a DNIS number and call type pair). As will be shown in FIG. 8, a default customer profile(s) can be stored on RPMS 709.

Figure 8:
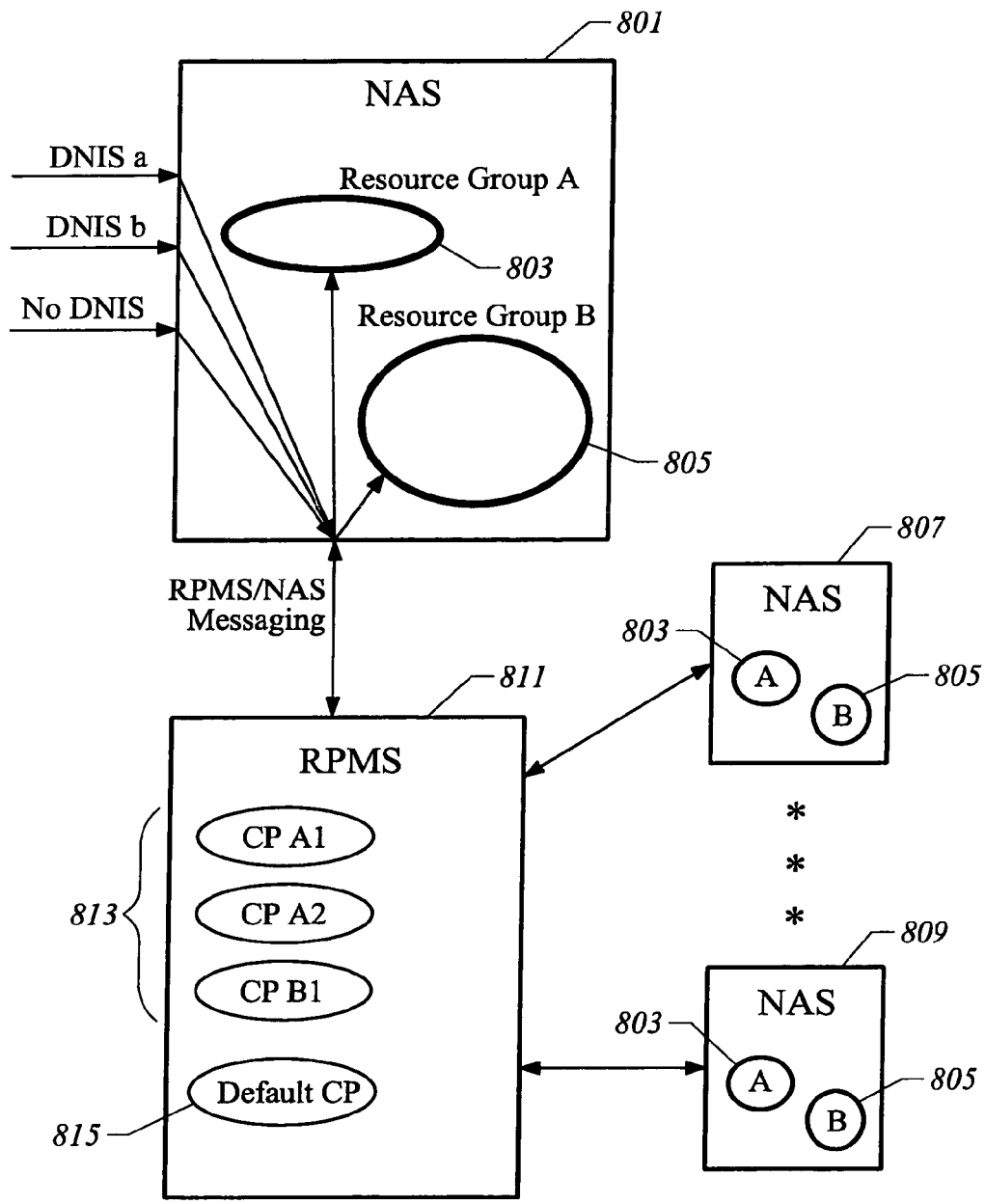
FIG. 8 shows that resource groups can be available on each NAS and an RPMS stores customer profiles that provide efficient access to the resources across the NASs.

By utilizing multiple NASs, resources from the NASs can be pooled together for more efficient utilization of the resources. FIG. 8 shows that resource groups can be available on each NAS and the RPMS stores customer profiles that provide efficient access to the resources across the NASs. A NAS 801 is shown to include resource groups 803 and 805. Similarly, NASs 807 and 809 also include resource groups 803 and 805. Resource groups of similar hardware and/or functionality (or services) are typically given the same name on each NAS as shown.

An RPMS 811 stores customer profiles 813 and a default customer profile 815. The operation of the system shown in FIG. 8 is similar to the one described above with a single NAS, but it provides an additional benefit in that resources can be shared between or among NASs. In other words, the resources that are of like type in all of the NASs can be thought of as pooled together.

Figure 9:
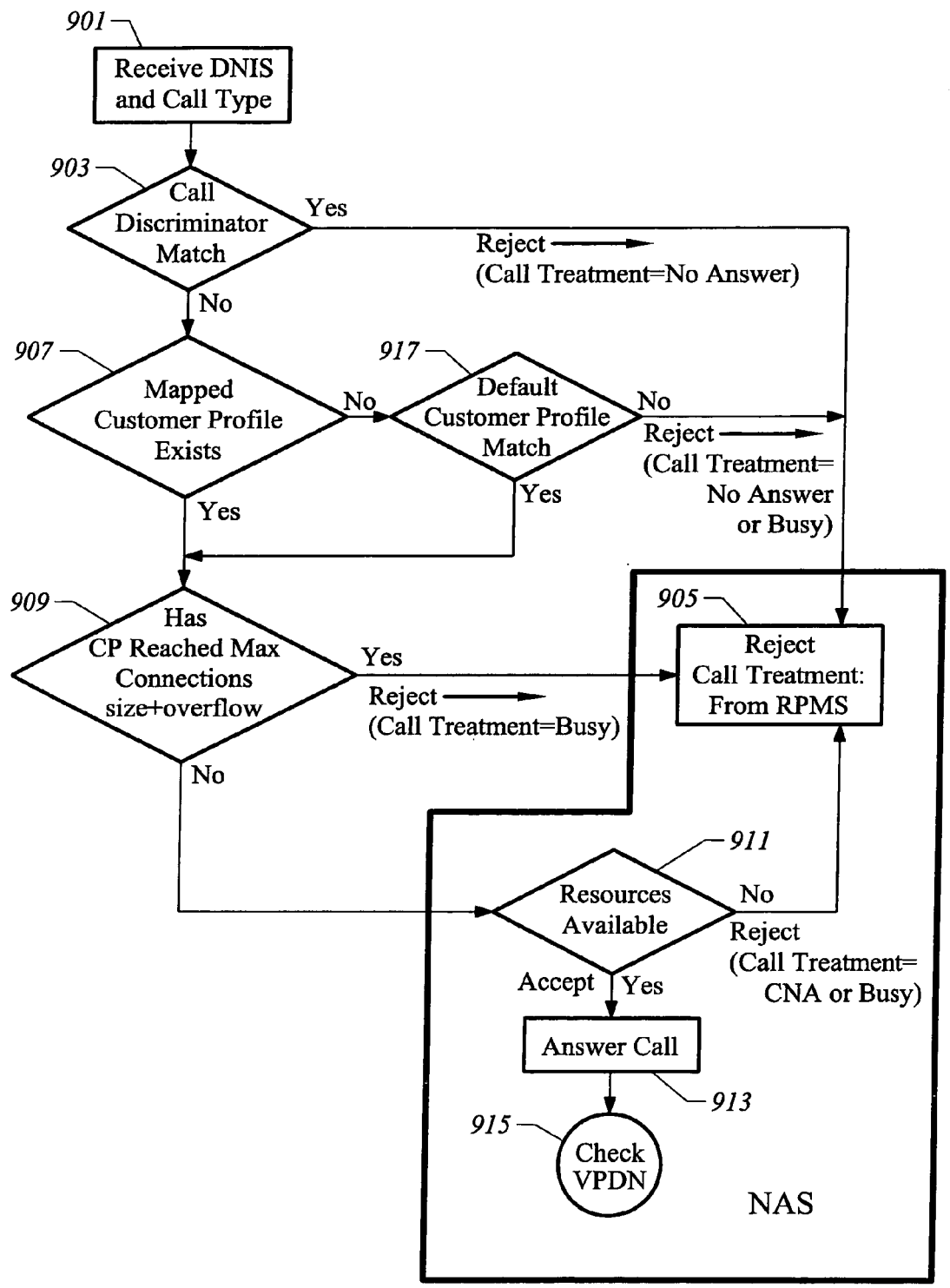
FIG. 9 illustrates a flow chart of a process of managing resources with multiple NASs and an RPMS, such as are shown in FIG. 8.

FIG. 9 illustrates a flow chart of a process of managing resources with multiple NASs and an RPMS, such as are shown in FIG. 8. At a step 901, a DNIS number and call type are received by a NAS and forwarded to the RPMS for processing. The RPMS checks to see if the DNIS number and call type pair have a match in the call discriminator definitions at a step 903. The call discriminator definitions specify DNIS number and call type pairs that should be rejected. If there is a match in the call discriminator definitions, the call should be rejected by the NAS at a step 905. Thus, the RPMS instructs the NAS to reject the call, such as by a no answer treatment.

If no match is found in the call discriminator definitions, the RPMS determines if there is a customer profile that specifies the DNIS number and call type pair at a step 907. If a customer profile specifies the DNIS number and call type pair, that call should generally be accepted, if a resource is available as follows.

At a step 909, the RPMS determines if the customer is consuming the maximum number of resources specified by the base amount and overflow amounts in the customer profile. If no, and a resource is available in the NAS at a step 911, the call is answered by the NAS at a step 913. A check is made at a step 615 to determined if VPDN information is specified in the customer profile because if it is, a VPDN tunnel should established. The NAS inquires if the VPDN information to establish a VPDN tunnel is provided in the customer profile and the RPMS responds with the VPDN information if it is available so the NAS can establish the VPDN tunnel. If, instead, a resource is not available at step 911, the call is rejected at step 905 such as by a busy signal or CNA.

Returning to step 909, if the customer has consumed the maximum number of connections specified by the base amount and overflow amount in the customer profile, the call is rejected at step 905.

If the DNIS number and call type pair were not found in a customer profile at step 907, the RPMS determines if a default customer profile exists that matches the call type at a step 917. If a default customer profile exists that matches the call type, the process proceeds to step 909 to determine if the call can be accepted, otherwise the process continues to step 905 to reject the call.

While the above is a complete description of preferred embodiments of the invention, various alternatives, modifications, and equivalents can be used. It should be evident that the invention is equally applicable by making appropriate modifications to the embodiments described above. For example, although the above has described DNIS numbers, the invention can also be advantageously applied to caller id numbers that represents the caller's telephone number. Therefore, the above description should not be taken as limiting the scope of the invention that is defined by the metes and bounds of the appended claims along with their full scope of equivalents.

What is claimed is:

1. A computer implemented method of managing access to resources, comprising:
receiving a telephone number and a call type, wherein the telephone number is of a party called by a caller requesting access to a resource;
identifying a customer profile from a plurality of customer profiles according to the telephone number and the call type;
utilizing the call type to identify a resource specified in the customer profile; and
determining an amount of the resource specified in the customer profile that is available for the customer to provide to callers, wherein the amount of the resource that is available is based on a base amount of the resource specified in the customer profile and an overflow amount of the resource specified in the customer profile to provide to callers if the base amount is being used by the customer.

2. The method of claim 1, further comprising:
determining if the telephone number and the call type is specified as calls that should be rejected;
and rejecting the call if the telephone number and the call type are specified as calls that should be rejected.

3. The method of claim 1, further comprising determining if the telephone number is included in a telephone number group in the customer profile.

4. The method of claim 3, wherein the telephone number group is a default group that includes all telephone numbers.

5. The method of claim 1, wherein the telephone number is a dialed number information service (DNIS) number.

6. The method of claim 1, wherein the resource is a modem, HDLC controller, integrated services digital network (ISDN) adapter, V.110 terminal adapter, V.120 terminal adapter, voice over IP codecs, or PIAFS.

7. The method of claim 1, wherein the call type is voice, modem, fax, digital, V.110, or V.120.

8. A network access server that manages access to resources, comprising:
a trunk that receives a telephone number and a call type, wherein the telephone number is of a party called by a caller requesting access to a resource;
a memory that stores a plurality of customer profiles, each customer profile specifying telephone numbers and call types that are valid for accessing at least one resource, a base amount of the at least one resource that is available for the customer to provide to callers and an overflow amount of the at least one resource that is available for the customer to provide to callers if the base amount is being used by the customer; and
a processor that determines if the telephone number and call type are specified in a customer profile as valid for accessing the resource the caller is requesting from the customer associated with the customer profile and the amount of the resource that is available.

9. The network access server of claim 8, wherein the processor utilizes the call type to identify the resource to which the caller is requesting access if the telephone number and call type are specified in the customer profile.

10. The network access server of claim 8, further comprising a plurality of resources that are organized in resource groups.

11. The network access server of claim 8, wherein the processor determines if the telephone number and call type are specified as calls that should be rejected; and rejects the call if the telephone number and call type are specified as calls that should be rejected.

12. The network access server of claim 8, wherein the processor determines if the telephone number is included in a telephone number group in the customer profile.

13. The network access server of claim 8, wherein the telephone number is a dialed number information service (DNIS) number.

14. The network access server of claim 8, wherein the resource is a modem, integrated services digital network (ISDN) adapter, V.110 terminal adapter, V.120 terminal adapter, voice over IP codecs, or PIAFS.

15. The network access server of claim 8, wherein the call type is voice, modem, fax, digital, V.110, or V.120.

16. A computer implemented method of managing access to resources, comprising:
receiving a telephone number and call type pair, wherein the telephone number is of a party called by a caller requesting access to a resource;
identifying a customer profile from a plurality of customer profiles according to the telephone number and call type pair;
determining if the telephone number and call type pair is specified in the customer profile as valid for accessing a resource the customer is providing to callers, wherein the customer profile includes a base amount of the resource that is available to the customer to provide to callers and an overflow amount of the resource that is available to the customer to provide to callers if the base amount is being used by the customer; and
utilizing the call type to identify the resource to which the caller is requesting access if the telephone number and call type are specified in the customer profile.

17. The method of claim 16, further comprising:
determining if the telephone number and call type pair is specified as calls that should be rejected;
and rejecting the call if the telephone number and call type pair is specified as calls that should be rejected.

18. The method of claim 16, wherein determining if the telephone number and call type pair is specified in a customer profile includes determining if the telephone number is included in a telephone number group in the customer profile.

19. The method of claim 16, wherein the telephone number group is a default group that includes all telephone numbers.

20. The method of claim 16, wherein the customer profile specifies a service to be applied to telephone calls.

21. The method of claim 20, wherein the service is a local service, virtual private dial network (VPDN) tunnel or direct access to a remote service.

22. A network access server that manages access to resources, comprising:
- a trunk that receives a telephone number and call type pair, wherein the telephone number is of a party called by a caller requesting access to a resource;
- a memory that stores a plurality of customer profiles, each customer profile specifying telephone number and call type pairs that are valid for accessing at least one resource, a base amount of the at least one resource that is available to the customer to provide to callers and an overflow amount of the at least one resource that is available to the customer to provide to callers if the base amount is being used by the customer; and
- a processor that determines if the telephone number and call type pair is specified in a customer profile as valid for accessing a resource the caller is requesting from the customer associated with the customer profile, wherein the processor utilizes the call type to identify the resource to which the caller is requesting access if the telephone number and call type are specified in the customer profile.

23. The network access server of claim 22, further comprising a plurality of resources that are organized in resource groups.

24. The network access server of claim 22, wherein the processor determines if the telephone number and call type pair is specified as calls that should be rejected; and rejects the call if the telephone number and call type pair is specified as calls that should be rejected.

25. The network access server of claim 22, wherein determining if the telephone number and call type pair is specified in a customer profile includes determining if the telephone number is included in a telephone number group in the customer profile.

26. A computer implemented method of managing access to services, comprising:
- answering a telephone call from a caller requesting access to a service;
- selecting a customer profile from a plurality of customer profiles based on a telephone number and a call type of the telephone call; and
- accessing the selected customer profile to determine a service to be applied to the telephone call;
- wherein the service is a local service, virtual private dial network (VPDN) tunnel or direct access to a remote service.

27. A network access server that manages access to services, comprising:
- a trunk that receives a telephone number and a call type, wherein the telephone number is of a party called by a caller requesting access to a resource;
- a memory that stores a plurality of customer profiles that specify a telephone number and a call type that are valid for accessing a service; and
- a processor that answers a telephone call from a caller requesting access to a service, selects a customer profile based on a telephone number and a call type of the telephone call, and accesses the customer profile to determine a service to be applied to the telephone call;
- wherein the service is a local service, virtual private dial network (VPDN) tunnel or direct access to a remote service.

* * * * *